United States Patent [19]
Hipple et al.

[11] Patent Number: 5,090,087
[45] Date of Patent: Feb. 25, 1992

[54] HUB ASSEMBLY FOR SOOTBLOWER

[75] Inventors: James H. Hipple; Don W. Smith; Steven P. Carpenter, all of Lancaster; Jesse C. Johnston, Carroll, all of Ohio

[73] Assignee: The Babcock & Wilcox Company, New Orleans, La.

[21] Appl. No.: 685,464

[22] Filed: Apr. 12, 1991

[51] Int. Cl.5 .................................... F23J 3/00
[52] U.S. Cl. ...................... 15/317; 277/104; 277/106
[58] Field of Search ............. 15/316.1, 317; 277/104, 277/106, 117, 123

[56] References Cited

U.S. PATENT DOCUMENTS

| | | | |
|---|---|---|---|
| 1,956,366 | 4/1934 | Vedovell | 286/11 |
| 2,185,450 | 1/1940 | Wager | 15/316.1 X |
| 2,287,207 | 6/1942 | Vedovell | 286/11 |
| 2,662,241 | 12/1953 | De Mart | 15/317 |
| 3,011,808 | 12/1961 | Tucker et al. | 286/12 |
| 3,140,503 | 7/1964 | De Mart | 15/317 |
| 3,179,426 | 4/1965 | Duer | 277/112 |
| 3,469,853 | 9/1969 | Gullick | 277/112 |
| 3,659,862 | 5/1972 | Sebestian | 277/106 |
| 3,785,659 | 1/1974 | Maurer et al. | 277/35 |
| 3,803,988 | 4/1974 | Orr | 92/85 |
| 3,968,970 | 7/1976 | Vogeli | 277/104 |
| 4,256,317 | 3/1981 | Havens et al. | 277/112 |
| 4,437,201 | 3/1984 | Zalewski | 15/316.1 |
| 4,451,047 | 5/1984 | Herd et al. | 277/26 |
| 4,498,213 | 2/1985 | Zalewski | 15/316.1 |
| 4,787,103 | 11/1988 | Endo | 4/441 |
| 4,809,993 | 3/1989 | Henshaw | 277/110 |

Primary Examiner—Chris K. Moore
Attorney, Agent, or Firm—Harness, Dickey & Pierce

[57] ABSTRACT

A sootblower hub having packing for sealing between a sootblower feed tube and lance tube. A packing gland is used which provides a live loading feature for exerting an axial force on the packing. The packing gland is comprised of elements which can be separately assembled in a manner which maintains a preload on the packing loading spring, even when it is disassembled from the sootblowing mechanism. Once the packing gland is installed into a sootblower carriage a preload maintaining member can be actuated to enable the axial loading force created by the spring to be transferred to the packing.

15 Claims, 2 Drawing Sheets

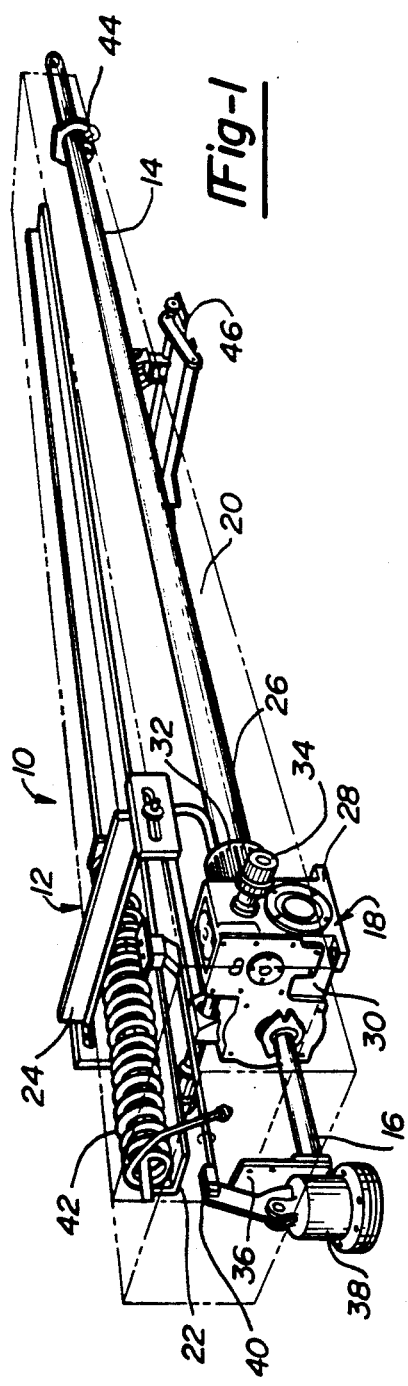
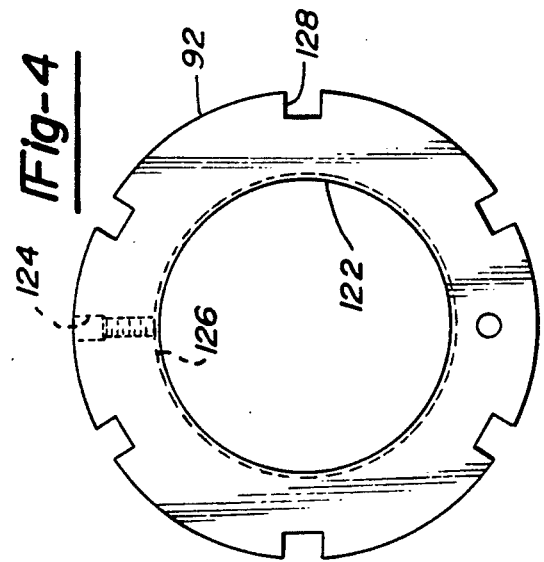
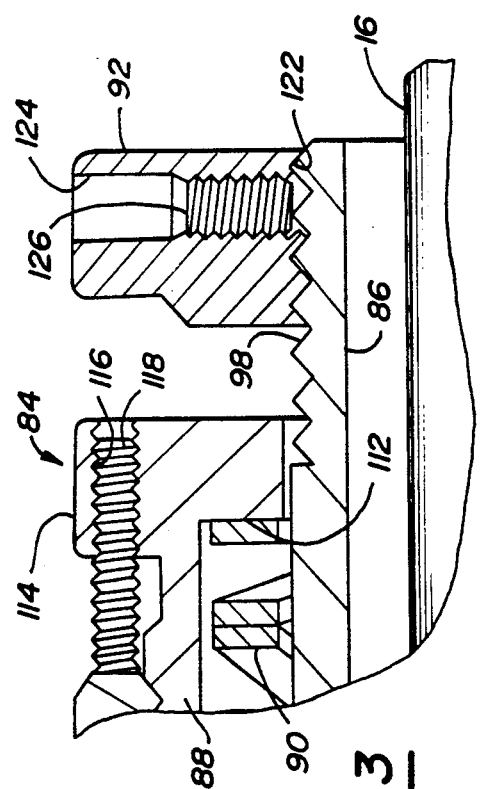

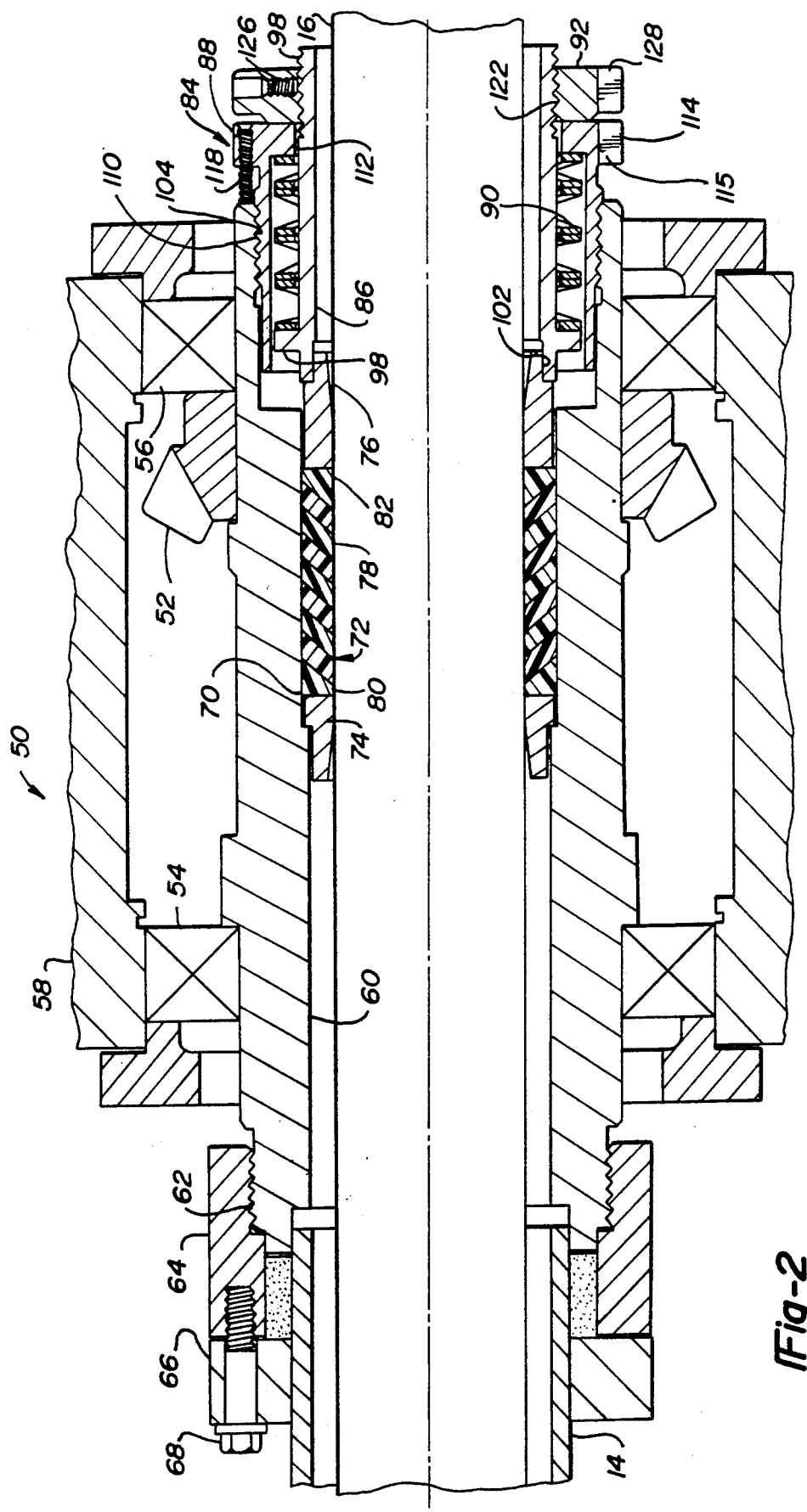

HUB ASSEMBLY FOR SOOTBLOWER

BACKGROUND AND SUMMARY OF THE INVENTION

This invention generally relates to sootblowers which are used to project a stream of a sootblowing medium against internal surfaces of a combustion device. In particular, this invention concerns a hub assembly which provides sealing between a stationary sootblowing medium feed tube and a relatively moveable lance tube.

Sootblowers are used to project a stream of cleaning medium such as water, air or steam against heat transfer surfaces within a combustion device such as large scale boilers to cause slag and ash encrustations to be removed. The cleaning medium impact produces mechanical and thermal shock which causes these adhering layers to be removed. One general category of sootblowers is known as the long retracting type. These devices have a retractable lance tube which is periodically advanced into and withdrawn from the boiler, and is often simultaneously rotated such that one or more cleaning medium nozzles on the lance tube project a jet of cleaning medium tracing a helical path. In typical sootblowers, a feed tube is held stationary relative to the sootblower structure. One end of the feed tube is supplied with the cleaning medium through a poppet valve. The sootblower lance tube slidably over-fits the feed tube and its longitudinal sliding and rotational motion is controlled by a carriage. The carriage moves along a toothed rack to move the lance tube longitudinally. The sootblowing medium supplied to the feed tube in turn pressurizes the inside of the lance tube with the sootblowing medium.

To prevent the escape of sootblowing medium from any area other than the nozzles which are oriented to project the sootblowing stream in a desired manner, a packing is provided in a stuffing box between the feed tube and lance tube. This packing is typically incorporated into a hub within the sootblower carriage which is used to drive the lance tube mechanism. Various types of packing material are presently employed. In todays practice, graphite foil type packing materials are frequently used. In order to generate the desired sealing action between the hub and feed tube, it is necessary to apply an axial force on the packing material. This force is normally provided through the use of a packing gland having clamping bolts which transfer a clamping force against the packing, causing the packing to be squeezed into engagement with the feed tube and hub. As the packing material wears, the degree of initial axial force or preloading which is provided by the packing gland is often lost. This force loss can result in leakage through the packing, which is undesirable.

In order to allow a certain degree of packing wear without leakage, it is ordinary procedure that axial loads are placed on the packing at the time of adjustment which exceeds that necessary to provide proper sealing. Such excessive loads allow a degree of packing wear without causing leakage. Such excessive axial loads result in higher wearing of the packing and produces packing friction against the feed tube which exceeds that which is necessary for sealing, resulting in increased power requirements for sootblower actuation. The need to provide a desired preload on the packing is also a maintenance concern since, for many sootblowers, it is necessary to periodically, and even daily, tighten the packing gland to keep the packing from leaking.

One approach toward gaining increased life of packing without the frequent maintenance of manually setting the packing preload, is to use a compliant element such as a spring for actuation of loading of the packing. Ideally, the compliant element would be capable of a considerable degree of displacement due to packing wear while providing an actuating force transferred to the packing within a desired range. Various types of springs could potentially be used, for example, a stack of Belleville washers, coil springs or wave type springs, etc. The desired force versus displacement relationship of such springs dictates a particular free spring length. If it is desired to place a compliant element to actuate the packing in a sootblower hub, by conventional design practices, it would be necessary to provide for the ability to compress the spring from its free length as it is being installed within the hub. This requirement would dictate that the hub be sufficiently long to accommodate compressing the spring from its free length to a compressed condition at which a desired preload level is generated. Although such designs using relatively long free length springs could be incorporated into sootblower hubs, the added length of the hub necessary to initially compress the spring would constitute additional sootblower "dead space" which is of concern to boiler makers. Dead space in this context can be defined as the amount that the length of the sootblower extending from the boiler wall exceeds the distance that the lance tube is projected into the boiler.

In addition to concerns about increasing the length of the hub, live loaded spring biased packing would typically require a degree of operator skill and training in setting a desired preloaded force level. There is a constant desire to improve the reliability and repeatability of sootblower and facilitate their replacement and repair. Accordingly, the elimination of special procedures and training in packing adjustment is preferred.

In addition to the concerns expressed previously, there is a desire, when using a compliant element to load the packing material, to protect the compliant element from the hostile environment within the proximity to boiler and to shield the element from contamination and temperature extremes.

The hub assembly in accordance with the present invention provides the previously described desirable features. These features are provided by employing a novel packing gland system of the invention. One of the components is a tubular gland follower which acts on the packing through a bushing. Surrounding the gland follower is a collar which threads into the sootblower hub. Both the collar and gland follower have surfaces which engage the ends of a compression spring.

During assembly of the above mentioned components, the spring is installed and the follower and collar are forced together, compressing the spring to a level which provides the desired packing preload. Thereafter, a preload ring is installed onto the gland follower which abuts against the collar preventing these parts from becoming separated and maintaining the spring in a compressed state even before the packing gland is installed into the hub. This design enables the packing gland to be mounted into the hub, and once the elements are properly positioned with the gland follower engaging the packing bushing, the preload ring can be disengaged from the collar, allowing the spring preload to be transferred into the packing.

The hub design of this invention reduces the hub length which would otherwise be required for preloading a loading spring, and also provides a protected environment for the spring. Moreover, the system enables the packing gland to be preassembled with a desired preload level thus reducing the chance of incorrect usage or maladjustment in the field. This invention further provides improved packing performance, reduces maintenance, and improves cycle life. The features of this invention are further readily adaptable to existing sootblowers, providing retro-fit capability.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of a long retracting sootblower of the type which may incorporate the hub assembly of the present invention.

FIG. 2 is a cross sectional view taken through the hub assembly of the carriage of FIG. 1 showing the elements which comprise the hub assembly of this invention, illustrated in an initially assembled condition.

FIG. 3 is a partial cross sectional view, showing the preload ring and collar disengaged when the sootblower is in an operating condition in a finally assembled condition.

FIG. 4 is a side view of the preload ring of the hub assembly of this invention.

DETAILED DESCRIPTION OF THE INVENTION

A representative sootblower which may incorporate the features of the present invention is shown in FIG. 1 and is generally designated there by reference number 10. Sootblower 10 principally comprises frame assembly 12, lance tube 14, feed tube 16, and carriage 18. Sootblower 10 is shown in its normal resting position. Upon actuation, lance tube 14 is extended into and retracted from a combustion system such as a boiler (not shown) and may be simultaneously rotated.

Frame assembly 12 includes a generally rectangularly shaped frame box 20 which forms a housing for the entire unit. Carriage 18 is guided along two pairs of tracks located on opposite sides of frame box 20, including a pair of lower tracks (not shown) and upper tracks 22. The tracks are made from angle iron stock which are connected to frame box 20 by threaded fasteners or welding. A pair of toothed racks (not shown) are rigidly connected to the upper tracks and are provided to enable longitudinal movement of carriage 18. Frame assembly 12 is supported at a wall box (not shown) which is affixed to the boiler wall or another mounting structure and is further supported by rear support brackets 24.

Carriage 18 drives lance tube 14 into and out of the boiler and includes drive motor 26 and gear box 28 which is enclosed by housing 30. Carriage 18 drives a pair of pinion gears 32 which engage the toothed racks to advance the carriage and lance tube 14. Support rollers 34 engage the guide tracks to support carriage 18.

Feed tube 16 is attached at one end to rear bracket 36 and conducts the flow of cleaning medium which is controlled through the action of poppet valve 38. Poppet valve 38 is actuated through linkages 40 which are engaged by carriage 18 to begin cleaning medium discharge upon extension of lance tube 14, and cuts off the flow once the lance tube and carriage return to their idle retracted position, as shown in FIG. 1. Lance tube 14 over-fits feed tube 16 and a fluid seal between them is provided by a packing. The details of the packing and the hub which retains it are principle aspects of the invention and are described in more detail below.

Coiled electrical cable 42 conducts power to the drive motor 26. Front support bracket 44 includes bearings which support lance tube 14 during its longitudinal and rotational motion. For long lance tube lengths, an intermediate support 46 may be provided to prevent excessive bending deflection of the lance tube. Additional details of the construction of the well-known design of "IK" types of sootblowers manufactured by assignee can be found with reference to U.S. Pat. Nos. 3,439,367 and 4,803,959, which are hereby incorporated by reference.

Now with specific reference to FIG. 2, the hub assembly according to this invention is shown which is generally designated by reference number 50. Hub assembly 50 is located within carriage 18 and is employed to drive lance tube 14 through its longitudinal and rotational movement. Hub assembly 50 is driven for rotation through bevel gear 52 and is supported by bearing assemblies 54 and 56 which support the hub assembly relative to carriage structure 58. Bevel gear 52 is driven by meshing with one or more additional gears within carriage 18 in a manner as described in assignees previously issued U.S. Pat. No. 4,803,959. Hub shell 60 is a generally tubular element having external surfaces for engaging bearing assemblies 54 and 56, and bevel gear 52. At the left hand axial end of hub shell 60, as shown in FIG. 2, external threads 62 are provided. Meshing with these threads is lance tube mounting collar 64. Lance tube mounting collar 64 is provided for connecting hub 60 to lance tube ring 66 which is welded to lance tube 14. Bolt 68 fastens the two elements together.

Internal features of hub shell 60 are provided to accommodate additional components of this invention. An internal cylindrical area defines stuffing box 70 which accommodates packing 72. A front bushing 74 has an externally stepped surface which engages with similar formations within hub shell 60, which prevents the bushing from being moved in the left hand direction from its position shown in FIG. 2. Rear bushing 76 is provided at the opposite axial end of packing 72 and combines with front bushing 74 to apply an axial compressive load onto packing 72. Packing 72 may be comprised of numerous types of packing material. One packing system in use today comprises a number of individually formed rings 78 of graphite foil material having conical end surfaces. End rings 80 and 82 are provided to "square up" the axial ends of the packing to engage flat against the bushings.

In accordance with this invention, a live loading packing gland 84 is provided which produces an axial force upon packing 72. Packing gland 84 principally comprises gland follower 86, collar 88, spring 90, and preload ring 92.

Gland follower 86 is a generally tubular element and has a radially projecting shoulder 96 near one end, and an externally threaded opposite end surface 98. Gland follower 86 engages rear bushing 76 and fits within bushing groove 102. The engagement between the two components can be an interference fit.

Collar 88 is also a tubular element which has external threads 110 which mesh with internal hub threads 104. Collar 88 overfits and surrounds gland follower 86, and is capable of axial movement relative to the gland follower. Collar 88 also defines a radially inward extending shoulder 112. One end of collar 88 is knurled and has a number of notches 115 at regularly spaced positions around the periphery of the collar which are provided for engagement by a spanner wrench (not shown). Collar 88 also includes axial threaded bores 116 which accommodates threaded set screws 118 which is provided to prevent the collar from rotating relative to hub shell 60 once installed.

Compression spring 90 is installed in the cavity bounded by gland follower 86 and collar 88 and can be of numerous types. However, these inventors have found that a wave spring configuration is well adapted for incorporation into the hub of this invention. Spring 90 acts upon radial shoulders 96 and 112 to exert a packing actuation force. It should be appreciated that although a wave type spring is illustrated, numerous other spring types could be employed in supplementing this invention such as conventional coil springs or Belleville washer stacks. In addition, it is conceivable that a number of small diameter coil springs could be used placed side-by-side around the periphery of the spring cavity.

Preload ring 92 has an internally threaded surface 122 which meshes with gland follower external threads 98. Preload ring 92 further includes a threaded bore 124 which receives set screw 126. Like collar 88, preload ring 92 defines external notches 128 at regularly spaced circumferential intervals which enable engagement and rotation using a spanner wrench.

In order to achieve the desired force versus deflection characteristics of spring 90, its free length must necessarily be long as compared with its compressed condition as illustrated in FIG. 2. In accordance with this invention, packing gland 84 enables spring 90 to be maintained in a compressed state even before packing gland 94 is installed into hub 60. During assembly of packing gland 84, spring 90 is compressed to the extent that preload ring 92 can be threaded onto gland follower threads 98. The packing gland 84 is thus a self-contained sub-assembly which restrains spring 90 in a preloaded state. In this condition, packing gland 84 can be installed simply by threading it into hub shell 60, preferably using a spanner wrench engaging collar 88. This threading is continued until gland follower 86 makes solid contact with the stacked assembly comprising the front and rear bushings 74 and 76, and packing 72. Throughout this installation process, preload ring 92 remains in contact with collar 88 under the influence of spring 90. However, once packing gland 84 is installed, preload ring 92 may be unscrewed so that it is no longer in engagement with collar 88. Once in this position, a locking screw 118 can be positioned to prevent the packing gland from inadvertently being unthreaded from hub shell 60. As preload ring 92 is backed off, the load exerted by spring 90 is transferred into packing 72. Preload ring 92 no longer serves a function during sootblower operation and can, therefore, be entirely removed. However, it is desirable to maintain preload ring 92 in an assembled condition on gland follower 86 so that it can be used to facilitate removal of the packing gland 84, for example, to replace packing material 72 or to install an additional packing ring 78.

To prevent complete removal of preload ring 92, a weld bead or deformation of gland follower threads 98 can be provided so that the preload ring cannot be entirely removed. This would also perform the important function of preventing tampering of the internal components of gland follower and more importantly, would prevent the energy stored in spring 90 from being suddenly released.

As is evident from the above description of the invention, since spring 90 is maintained in a preloaded condition, it can have a free length which is considerably greater than that which could be accommodated by the actual length of gland follower 86. Moreover, since spring 90 is maintained in a preloaded condition, it is not necessary to thread a spring actuating member along a long length of threads to achieved the desired preload. Rather, packing gland 84 can be easily installed and removed without being subjected to the forces exerted by the spring. Another advantageous feature of the hub assembly 50 of this invention is that it provides a relatively protected environment for spring 90 which, as is shown in the figures, is enclosed by cylindrical walls, both around its inner-diameter and outer-diameter. Yet another feature is the visual indication of packing wear which packing gland 84 provides. An operator can readily observe the separation between collar 88 and a fully backed-off preload ring 92 to determine the stacked length or wear of the packing 72.

While the above description constitutes the preferred embodiments of the present invention, it will be appreciated that the invention is susceptible of modification, variation and change without departing from the proper scope and fair meaning of the accompanying claims.

We claim:

1. A hub assembly for a sootblower having a feed tube with a lance tube overfitting said feed tube, and a carriage assembly coupled to said lance tube for causing said lance tube to move relative to said feed tube, wherein a sootblowing medium supplied to said feed tube flows into said lance tube and is ejected from one or more sootblowing nozzles carried by said lance tube for cleaning surfaces within a combustion device, comprising:

a hub encircling said feed tube, packing within a stuffing box formed between said feed tube and said hub, and packing loading means for applying a load on said packing including a first member for coupling to said hub, a second member for coupling to said packing and a compliant element acting upon said first and second members for exerting said load on said packing, and preload maintaining means for enabling said compliant element to be maintained in a preloaded state when said first member is decoupled from said hub and said second member is decoupled from said packing and being actuatable to transfer said load onto said packing when said first member is coupled to said hub and said second member is coupled to said packing.

2. A hub assembly for a sootblower according to claim 1 wherein said carriage assembly causes said lance tube to be extended into and retracted from said combustion device and simultaneously rotated whereby a jet of said sootblowing medium ejected from said nozzle traces a helical path.

3. A hub assembly for a sootblower according to claim 1 wherein said first member comprises a tubular collar.

4. A hub assembly for a sootblower according to claim 3 wherein said second member comprises a tubular gland follower.

5. A hub assembly for a sootblower according to claim 4 wherein said compliant element comprises a compression spring disposed in a cavity defined between said collar and said gland follower.

6. A hub assembly for a sootblower according to claim 5 wherein said tubular collar and said gland follower are axially moveable relative to each other and said collar and said gland follower each define radial surfaces for engaging opposite axial ends of said compliant element.

7. A hub assembly for a sootblower according to claim 6 wherein said preloaded maintaining means comprises a preload ring mounted onto said gland follower engageable with said collar as said compliant element urges said gland follower into engagement with said preload ring.

8. A hub assembly for a sootblower according to claim 7 wherein said preload ring is threaded onto said gland follower.

9. A hub assembly for a sootblower according to claim 3 wherein said collar is threaded into said hub.

10. A hub assembly for a sootblower according to claim 1 wherein said compliant element comprises a wave spring.

11. A hub assembly for a sootblower having a feed tube with a lance tube overfitting said feed tube, and a carriage assembly coupled to said lance tube for causing said lance tube to move relative to said feed tube, wherein a sootblowing medium supplied to said feed tube flows into said lance tube and is ejected from one or more sootblowing nozzles carried by said lance tube for cleaning surfaces within a combustion device, comprising:

a tubular hub encircling said feed tube and connectable to said lance tube, said hub defining a stuffing box, packing disposed within said stuffing box, a tubular gland follower engageable with said packing, a tubular collar mountable to said hub and overfitting said gland follower for axial movement thereto, a compression spring acting upon both said collar and said gland follower for exerting an axial load on said packing and, a preload maintaining means coupled to both said follower and said collar to provide a preload on said compression spring when said gland follower is disengaged with said packing and said collar is disengaged from said hub, and being actuatable to transfer said preload onto said packing when said gland follower engages said packing and said collar engages said hub.

12. A hub assembly according to claim 11 wherein said collar threads into said hub.

13. A hub assembly according to claim 11 wherein said gland follower includes an externally threaded surface and said preload maintaining means comprises a ring threaded onto said gland follower abutting said collar when said collar is decoupled from said hub and which can be unthreaded from contact with said collar when said collar is threaded into said hub and said gland follower engages said packing.

14. A hub assembly according to claim wherein said collar is threaded into said hub and said gland follower engages said packing.

15. A hub assembly for a sootblower having a feed tube with a lance tube overfitting said feed tube, and a carriage assembly coupled to said lance tube for causing said lance tube to move relative to said feed tube, wherein a sootblowing medium supplied to said feed tube flows into said lance tube and is ejected from one or more sootblowing nozzles carried by said lance tube for cleaning surfaces within a combustion device, comprising:

a tubular hub encircling said feed tube and connectable to said lance tube at one axial end and said hub defining a stuffing box and threads adjacent a second axial end, packing disposed within said stuffing box, a tubular gland follower having one axial end acting upon said packing and a threaded opposite end, said follower further defining a radially extending shoulder, a tubular collar having threads for meshing with said hub threads and overfitting said gland follower for axial movement thereto, said collar defining a radially extending shoulder, a compression spring disposed in a cavity between said gland follower and said collar and engaging both said radial surfaces, and a preload ring threaded onto said gland follower threads and being rotatable to a first position in engagement with said collar for maintaining a desired preload on said compression spring and being rotatable to a second position disengaged from said collar enabling said compressing spring load to be transferred to said packing.

* * * * *

UNITED STATES PATENT AND TRADEMARK OFFICE
CERTIFICATE OF CORRECTION

PATENT NO. : 5,090,087
DATED : February 25, 1992
INVENTOR(S) : James H. Hipple et al It is certified that error appears in the above-identified patent and that said Letters Patent is hereby corrected as shown below:

Column 8, line 17, claim 14, after "claim" insert --11--.

Signed and Sealed this

Twenty-eighth Day of September, 1993

Attest:

BRUCE LEHMAN

*Attesting Officer*  *Commissioner of Patents and Trademarks*